United States Patent [19]

Reinecke

[11] 4,324,436
[45] Apr. 13, 1982

[54] AUTOMATIC LOAD-DEPENDENT BRAKING-FORCE CONTROL DEVICE

[75] Inventor: Erich Reinecke, Burgdorf, Fed. Rep. of Germany

[73] Assignee: WABCO Fahrzeugbremsen GmbH, Hanover, Fed. Rep. of Germany

[21] Appl. No.: 117,683

[22] Filed: Feb. 1, 1980

[30] Foreign Application Priority Data

Feb. 26, 1979 [DE] Fed. Rep. of Germany ....... 2907425

[51] Int. Cl.³ .............................................. B60T 8/22
[52] U.S. Cl. .................................... 303/22 R; 303/54
[58] Field of Search ................ 303/22 A, 22 R, 23 A, 303/23 R, 40, 54

[56] References Cited

U.S. PATENT DOCUMENTS 4,125,290 11/1978 Reinecke et al. ................... 303/22R Primary Examiner—Duane A. Reger
Attorney, Agent, or Firm—R. S. Visk

[57] ABSTRACT

A load-dependent braking force control device operable responsively to initial brake actuating pressure for initiating a light brake application until such pressure attains a certain predetermined higher valve, whereupon the control device, which is subject to a control pressure reflecting vehicle load, responds to such vehicle load control pressure for effecting a brake application accordingly. A piston for operating a fluid pressure supply and cut-off valve is subject on one side to fluid pressure supplied to the brake cylinders and on the opposite side to the same pressure communicated thereto via an adjustable pressure-limiting valve device, thereby determining the cut-off degree of the brake cylinder pressure.

4 Claims, 1 Drawing Figure

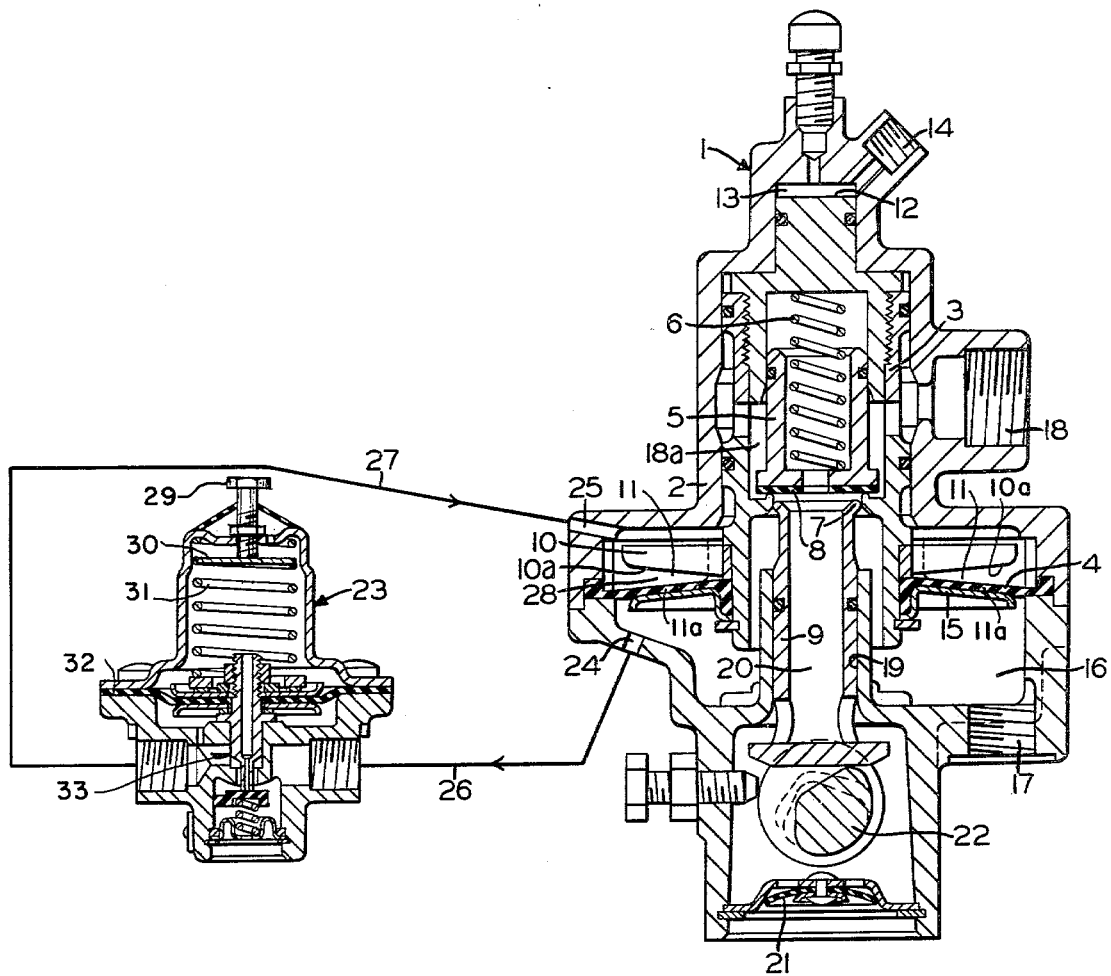

AUTOMATIC LOAD-DEPENDENT BRAKING-FORCE CONTROL DEVICE

BACKGROUND OF THE INVENTION

The invention concerns an automatic load-dependent braking-force control device for fluid pressure actuated brake systems in motor vehicles or trailers.

Braking-force control devices operable according to a function of vehicle load are known. In such devices, the load-dependent graduation of the braking force becomes effective only after a certain braking pressure has been attained; that is, in the initial stage of a braking operation or during light partial braking, the brake cylinders are subjected to pressure not affected by the load-dependent control function, that is, they are acted upon by non-controlled brake pressure. Only at a higher brake pressure, the magnitude of which is adjustable, is this pressure controlled as a function of load and transmitted in this way to the brake cylinders.

The disadvantage of this known braking-force control device, however, is that, in the precontrol range, that is, the range between initial braking pressure and the braking pressure at which the load-dependent control begins, there is poor graduation since only a small area of the central piston is available as an area of action and reaction.

SUMMARY OF THE INVENTION

The object of the present invention, therefore, is to provide a braking-force control device whose graduation function is as efficient in the precontrol range as the graduation in the load-dependent control range.

In the present load responsive brake pressure control device, finely graduated braking is made possible, even at low brake pressures, by the application of pressure on a large upper diaphragm surface immediately upon actuation of the brake. On the other hand, the invention also eliminates the dynamic influencing of the yield point, i.e., the point at which the load-dependent control function starts, as a result of slow and rapid control, since the control output pressure (pressure behind the valve) is routed through a pressure-limiting valve controlling the free control pressure, to a precontrol chamber above the diaphragm by the pressure limiting valve up to its adjusted pressure.

The single FIGURE drawing shows an automatic load-dependent braking-force controller with a pressure-limiting valve arranged outside braking-force controller and controlling the precontrol.

DESCRIPTION & OPERATION

A braking-force controller 1 illustrated in the drawing comprises a housing 2 in the upper part of which a braking-pressure control piston assembly comprising a piston 3 and a diaphragm 4, is arranged and has, in an internal recess formed in the piston, a dual function valve body 5 acted upon by compression of a spring 6. Valve body 5, along with a supply valve seat 7 arranged on the inside wall of piston 3, forms an intake or supply valve assembly, while said valve body, along with an exhaust valve 8 carried by the lower end of said valve body adjacent an upper end of a hollow plunger 9 axially aligned underneath the valve body 5, forms an exhaust valve assembly. The piston 3 is provided with a number of radial ribs 10, whose lower surfaces 10a facing diaphragm 4 forms part of a cone-shaped shell. Housing 2 has affixed thereto a plurality of radially disposed, equiangularly spaced ribs 11, into whose angular spaces ribs 10 intermesh without contact, and whose lower surfaces 11a facing diaphragm 4 forms parts of a cone-shaped shell opposite it.

In the position shown in the drawing, diaphragm 4 is resting against these lower surfaces 11a.

Diaphragm 4 is secured at its outer periphery to housing 2 and at an inner periphery to piston 4. In this way, the brake-pressure control piston assembly 3, 4 is formed, which has an upper fixed-dimension effective pressure area 12, which is part of a control chamber 13 situated over piston 3. Control chamber 13 communicates with a fluid pressure control port 14, which establishes communication to a pneumatic or hydraulic brake-pressure transmitter or source (not shown) reflecting vehicle load. The brake-pressure control piston assembly 3, 4 also has a lower variable effective pressure area 15, which varies with movement of piston 3, and is part of a delivery chamber 16 situated under diaphragm 4, which chamber communicates with a delivery port 17, which leads to the brake cylinders (not shown), and which is also connected via the opened intake valve assembly 5, 7 (when in an open position) and a supply chamber 18a with a fluid pressure supply port 18 connected to a source of fluid under pressure such as a storage reservoir (not shown).

The hollow plunger 9, whose upper end, as mentioned above, forms a valve seat for exhaust valve 8, is guided in a central bore 19 of housing 2, and whose internal space 20 is exhausted through a pressure release valve 21.

The plunger 9 is in operative connection with a cam disk or cam 22, whose position is dependent on the vehicle weight or axle load. A shaft (not shown) connected with cam disk 22 is connected with the vehicle axle (not shown) via a sprung portion thereof (not shown).

A pressure-limiting valve device 23 forming the precontrol device is connected via connections 24 and 25 and lines 26 or 27 between the chamber 16 under diaphragm 4 and a chamber 28 situated above said diaphragm.

The function of the brake controller shown here is as follows: the control pressure transmitted pneumatically or hydraulically by the brake-pressure transmitter passes into control chamber 13 via control port 14, acts on the top side 12 of piston 3 and effects downward movement thereof. The dual function valve body 5 follows this motion under the influence of spring 6, comes to rest on the upper surface of plunger 9 designed as a valve seat, thereby closing the exhaust valve 8, and opening intake valve assembly 5, 7 when the piston 3 travels further downwardly. Fluid pressure then flows from the fluid pressure supply reservoir through connection 18 into chamber 18a through the opened supply valve assembly 5, 7 and through connection 17 into the brake cylinders (not shown) via delivery chamber 16 underneath diaphragm 4. During downward movement of piston 3, diaphragm 4 disengages itself from the ribs 11 situated in housing 2, and applies itself increasingly to ribs 10 of piston 3. The effective membrane surface is therefore steadily increased until the lower force acting on the under side of the piston exceeds the upper force acting on its upper side whereupon piston 3 is again moved upwardly and supply valve assembly 5, 7 is closed. A brake-pressure cut-off position is reached. The pressure now prevailing in the brake cylinders corresponds to the pressure determined as a function of and corresponding to vehicle load. Only in the situation of a full-load condition, or a ratio of 1:1, does the supply valve assembly 5, 7 remain open. The pressure then measurable in the brake cylinders in the fully loaded vehicle corresponds to the pressure introduced in the brake-force control by the brake-pressure transmitter; however, when the vehicle is partially loaded or empty, this pressure will be decreased accordingly.

The connection of the two chambers 16 and 28 below and above, respectively, diaphragm piston 4, situated one over the other, via the pressure-limiting valve 23, causes the pressure decrease to be suspended or heightened under low brake pressure, or so called pressure precontrol, the extent of which depends on the adjustment of the pressure-limiting valve 23.

In order to adjust pressure-limiting valve 23 for the desired degree of fluid pressure delivered to line 27 and chamber 28, an adjusting screw 29 is disposed through the top of said limiting valve to act on a spring seat 30 against which a cut-off spring 31 rests. Spring 31 is compressedly disposed between spring seat 30 and a diaphragm piston 32 subjected on the opposite side to pressure from delivery chamber 16 via line 26. With pressure-limiting valve 23 set by adjusting screw 29, a supply valve mechanism 33 in said limiting valve functions in a conventional self-lapping manner for limiting the pressure of fluid thus supplied to the adjusted setting.

After the brake pressure is decreased, fluid pressure in the brake cylinders causes piston 3 to move to its upper position, and such fluid pressure escapes through exhaust valve assembly 5, 8 through bore 20 in plunger 9 and through pressure release valve 21.

Having now described the invention, what I claim as new and desire to secure by Letters Patent, is:

1. An automatic load-dependent braking-force control device for fluid pressure actuated brake systems in motor vehicles or trailers and comprising:
   (a) a brake-pressure control piston assembly subjectable to brake control pressure and including a control piston and a flexible diaphragm secured thereto for axial movement therewith,
   (b) a dual function valve body cooperating alternatively with a supply valve seat to form a supply valve assembly and with an exhaust valve member to form an exhaust valve assembly,
   (c) said control piston having an upper pressure surface subjectable to brake control pressure of a brake-pressure transmitter via a control chamber and a fluid pressure control port,
   (d) said diaphragm having a lower pressure surface adjacent a brake-pressure delivery chamber communicating with and for delivering wheel brake cylinder pressure to a delivery port,
   (e) the degree of brake pressure delivered to said delivery port being determined via a cam element positionable according to vehicle weight, and wherein the improvement comprises:
   (f) a pressure-limiting valve device via which the brake-pressure delivery chamber situated below the diaphragm of said brake-pressure control piston assembly is connected with a supply chamber situated above said diaphragm.

2. An automatic load-dependent braking-force control device according to claim 1, wherein the pressure-limiting valve device is connected as a separate valve unit with said delivery chamber and said supply chamber, via respective lines, to ports formed in a housing of the automatic load-dependent control device.

3. An automatic load-dependent braking-force control device according to claim 2, wherein said pressure-limiting valve device includes a self-lapping supply valve assembly via which fluid pressure from said supply chamber is supplied to said delivery chamber at a predetermined pressure.

4. An automatic load-dependent braking-force control device according to claim 3, wherein said self-lapping supply valve assembly includes a cut-off spring for operating the supply valve assembly to a cut-off position in which said predetermined pressure is established, and an adjusting screw for adjusting the compression of said cut-off spring to a valve commensurate with the predetermined pressure desired.

* * * * *